United States Patent
Chavez et al.

(10) Patent No.: US 11,851,290 B2
(45) Date of Patent: *Dec. 26, 2023

(54) ROBOTIC MULTI-ITEM TYPE PALLETIZING AND DEPALLETIZING

(71) Applicant: Dexterity, Inc., Redwood City, CA (US)

(72) Inventors: Kevin Jose Chavez, Redwood City, CA (US); Yuan Gao, Santa Clara, CA (US); Rohit Pidaparthi, Mountain View, CA (US); Talbot Morris-Downing, Redwood City, CA (US); Harry Zhe Su, Union City, CA (US); Samir Menon, Menlo Park, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/096,846

(22) Filed: Jan. 13, 2023

(65) Prior Publication Data
US 2023/0143976 A1    May 11, 2023

Related U.S. Application Data

(63) Continuation of application No. 17/211,679, filed on Mar. 24, 2021, now Pat. No. 11,591,169, which is a
(Continued)

(51) Int. Cl.
*B65G 47/90*    (2006.01)
*B25J 9/16*    (2006.01)

(52) U.S. Cl.
CPC .......... *B65G 47/905* (2013.01); *B25J 9/1697* (2013.01)

(58) Field of Classification Search
CPC ................... B65G 47/90; B65G 61/00; G05B 2219/40067; B25J 9/1687
(Continued)

(56) References Cited

U.S. PATENT DOCUMENTS

| 5,501,571 A | 3/1996 | Van Durrett |
| 5,908,283 A | 6/1999 | Huang |

(Continued)

FOREIGN PATENT DOCUMENTS

| CA | 2357271 | 9/2002 |
| CN | 107000208 | 8/2017 |

(Continued)

OTHER PUBLICATIONS

Gratal et al: "Scene Representation and Object Grasping Using Active Vision", https://batavia.internal.epo.org/digital-file-repository/digital-file-repository-fro ntend-prod/dossier/EP1991600I?toc=Logggv0b bhd69lv, Jan. 1, 2010 (Jan. 1, 2010), XP055572509.
(Continued)

*Primary Examiner* — Timothy R Waggoner
(74) *Attorney, Agent, or Firm* — Van Pelt, Yi & James LLP

(57) ABSTRACT

Techniques are disclosed to use a robotic arm to palletize or depalletize diverse items. In various embodiments, data associated with a plurality of items to be stacked on or in a destination location is received. A plan to stack the items on or in the destination location is generated based at least in part on the received data. The plan is implemented at least in part by controlling a robotic arm of the robot to pick up the items and stack them on or in the receptacle according to the plan, including by for each item: using one or more first order sensors to move the item to a first approximation
(Continued)

of a destination position for that item at the destination location; and using one or more second order sensors to snug the item into a final position.

20 Claims, 12 Drawing Sheets

Related U.S. Application Data continuation of application No. 16/716,284, filed on Dec. 16, 2019, now Pat. No. 10,994,949, which is a continuation of application No. 16/380,859, filed on Apr. 10, 2019, now Pat. No. 10,549,928.

(60) Provisional application No. 62/809,389, filed on Feb. 22, 2019.
(58) Field of Classification Search
USPC .................................... 700/231, 217, 245
See application file for complete search history.

(56) References Cited

U.S. PATENT DOCUMENTS

| | | | |
|---|---|---|---|
| 8,930,019 | B2 | 1/2015 | Allen |
| 9,089,969 | B1 | 7/2015 | Theobald |
| 9,315,344 | B1 | 4/2016 | Lehmann |
| 9,327,406 | B1 | 5/2016 | Hinterstoisser |
| 9,802,317 | B1 | 10/2017 | Watts |
| 9,811,892 | B1 | 11/2017 | Silverstein |
| 10,124,489 | B2 | 11/2018 | Chitta |
| 10,207,868 | B1 | 2/2019 | Stubbs |
| 10,549,928 | B1 | 2/2020 | Chavez |
| 10,906,188 | B1 | 2/2021 | Sun |
| 11,591,169 | B2 * | 2/2023 | Chavez .................. B25J 9/1697 |
| 2002/0106273 | A1 | 8/2002 | Huang |
| 2002/0164067 | A1 | 11/2002 | Askey |
| 2007/0280812 | A1 | 12/2007 | Morency |
| 2009/0033655 | A1 | 2/2009 | Boca |
| 2010/0324729 | A1 | 12/2010 | Ruge |
| 2012/0259582 | A1 | 10/2012 | Gloger |
| 2013/0315479 | A1 | 11/2013 | Paris |
| 2015/0035272 | A1 | 2/2015 | Johnson |
| 2015/0352721 | A1 | 12/2015 | Wicks |
| 2016/0016311 | A1 | 1/2016 | Konolige |
| 2016/0075031 | A1 | 3/2016 | Gotou |
| 2016/0207195 | A1 | 7/2016 | Eto |
| 2016/0229061 | A1 | 8/2016 | Takizawa |
| 2016/0272354 | A1 | 9/2016 | Nammoto |
| 2017/0246744 | A1 | 8/2017 | Chitta |
| 2017/0267467 | A1 | 9/2017 | Kimoto |
| 2018/0086572 | A1 | 3/2018 | Kimoto |
| 2018/0144458 | A1 | 5/2018 | Xu |
| 2018/0162660 | A1 | 6/2018 | Saylor |
| 2018/0308254 | A1 | 10/2018 | Fu |
| 2019/0000564 | A1 | 1/2019 | Navab |
| 2019/0016543 | A1 | 1/2019 | Turpin |
| 2019/0102965 | A1 | 4/2019 | Greyshock |
| 2019/0362178 | A1 | 11/2019 | Huang |
| 2020/0117212 | A1 | 4/2020 | Tian |
| 2020/0130961 | A1 | 4/2020 | Diankov |

FOREIGN PATENT DOCUMENTS

| | | |
|---|---|---|
| CN | 107088877 | 8/2017 |
| CN | 108972564 | 12/2018 |
| CN | 109255813 | 3/2021 |
| EP | 1489025 | 12/2004 |
| EP | 3349182 | 7/2018 |
| JP | 2001184500 | 7/2001 |
| JP | 2006302195 | 11/2006 |
| JP | 5905549 | 4/2016 |
| WO | 9823511 | 6/1998 |
| WO | 2017195801 | 11/2017 |
| WO | 20180130491 | 7/2018 |

OTHER PUBLICATIONS

Ji et al: "Autonomous 3D scene understanding and exploration in cluttered workspaces using point cloud data", 2018 IEEE 15th International Conference on Networking, Sensing and Control (ICNSC), IEEE, Mar. 27, 2018 (Mar. 27, 2018), pp. 1-6, XP033340626, DOI: 10.1109/ICNSC.2018.8361275 [retrieved on May 18, 2018].
Kakiuchi et al: "Creating household environment map for environment manipulation using color range sensors on environment and robot", Robotics and Automation (ICRA), 2011 IEEE International Conference on, IEEE, May 9, 2011 (May 9, 2011), pp. 305-310, XP032034341, DOI: 10.1109/ICRA.2011.5980522. ISBN: 978-1-61284-386-5.
Chen et al. "Random Bin Picking with Multi-view Image Acquisition and CAD-Based Pose Estimation," 2018 IEEE International Conference on Systems, Man, and Cybernetics (SMC), USA, IEEE, Oct. 7, 2018, pp. 2218-2223 (Document disclosing the well-known art).
Kato et al. "Extraction of Reference Point Candidates from Three-Dimensional Point Group and Learning of Relative Position Concepts," The 23rd Symposium on Sensing via Image Information SSII2017, Japan, SSII, Jun. 7, 2017, pp. 1-6 (Document disclosing the well-known art) (Note) Part or all of the presented non-patent documents may not be sent due to limitation by law or contract.
Nishida et al., "Object Classification Considering Movability Based on Shape Features with Parts Decomposition," Transactions of the Society of Instrument and Control Engineers, Japan, The Society of Instrument and Control Engineers, May 31, 2015, vol. 51, No. 5, pp. 319-328.
Takeguchi et al., "Robust Object Recognition through Depth Aspect Image by Regular Voxels," The IEICE Transactions on Information and Systems, Japan, The Institute of Electronics, Information and Communication Engineers, Sep. 1, 2003, vol. J86-D-II, No. 9, pp. 1308-1319.

* cited by examiner

ROBOTIC MULTI-ITEM TYPE
PALLETIZING AND DEPALLETIZING

CROSS REFERENCE TO OTHER
APPLICATIONS

This application is a continuation of U.S. patent application Ser. No. 17/211,679, entitled ROBOTIC MULTI-ITEM TYPE PALLETIZING & DEPALLETIZING filed Mar. 24, 2021 which is incorporated herein by reference for all purposes, which is a continuation of U.S. patent application Ser. No. 16/716,284, entitled ROBOTIC MULTI-ITEM TYPE PALLETIZING & DEPALLETIZING filed Dec. 16, 2019, now U.S. Pat. No. 10,994,949, which is incorporated herein by reference for all purposes, which is a continuation of U.S. patent application Ser. No. 16/380,859, entitled ROBOTIC MULTI-ITEM TYPE PALLETIZING & DEPALLETIZING filed Apr. 10, 2019, now U.S. Pat. No. 10,549,928, which is incorporated herein by reference for all purposes, which claims priority to U.S. Provisional Patent Application No. 62/809,389 entitled ROBOTIC MULTI-ITEM TYPE PALLETIZING & DEPALLETIZING filed Feb. 22, 2019 which is incorporated herein by reference for all purposes.

BACKGROUND OF THE INVENTION

Shipping and distribution centers, warehouses, shipping docks, air freight terminals, big box stores, and other activities that ship and receive non-homogeneous sets of items use strategies such as packing and unpacking dissimilar items in boxes, crates, containers, conveyor belts, and on pallets, etc. Packing dissimilar items in boxes, crates, on pallets, etc. enables the resulting sets of items to be handled by heavy lifting equipment, such as forklifts, cranes, etc., and enables items to be packed more efficiently for storage (e.g., in a warehouse) and/or shipment (e.g., in truck, cargo hold, etc.).

In some contexts, items may be so dissimilar in size, weight, density, bulkiness, rigidity, strength of packaging, etc. that any given item or set of items may or may not have attributes that would enable those items to support the size, weight, distribution of weight, etc., of a given other item that might be required to be packed (e.g., in a box, container, pallet, etc. When assembling a pallet or other set of dissimilar items, items must be selected and stacked carefully to ensure the palletized stack does not collapse, lean, or otherwise become unstable (e.g., so as not to be able to be handled by equipment such as a forklift, etc.) and to avoid item damage.

Currently, pallets typically are stacked and/or unpacked by hand. Human workers select items to be stacked, e.g., based on a shipping invoice or manifest, etc., and use human judgment and intuition to select larger and heavier items to place on the bottom, for example. However, in some cases, items simply arrive via a conveyor or other mechanism and/or are selected from bins in an order listed, etc., resulting in an unstable palletized or otherwise packed set.

Use of robotics is made more challenging in many environments due to the variety of items, variations the order, number, and mix of items to be packed, on a given pallet for example, and a variety of types and location of container and/or feed mechanism from which items must be picked up to be placed on the pallet or other container.

BRIEF DESCRIPTION OF THE DRAWINGS

Various embodiments of the invention are disclosed in the following detailed description and the accompanying drawings.

DETAILED DESCRIPTION

Figure 1:
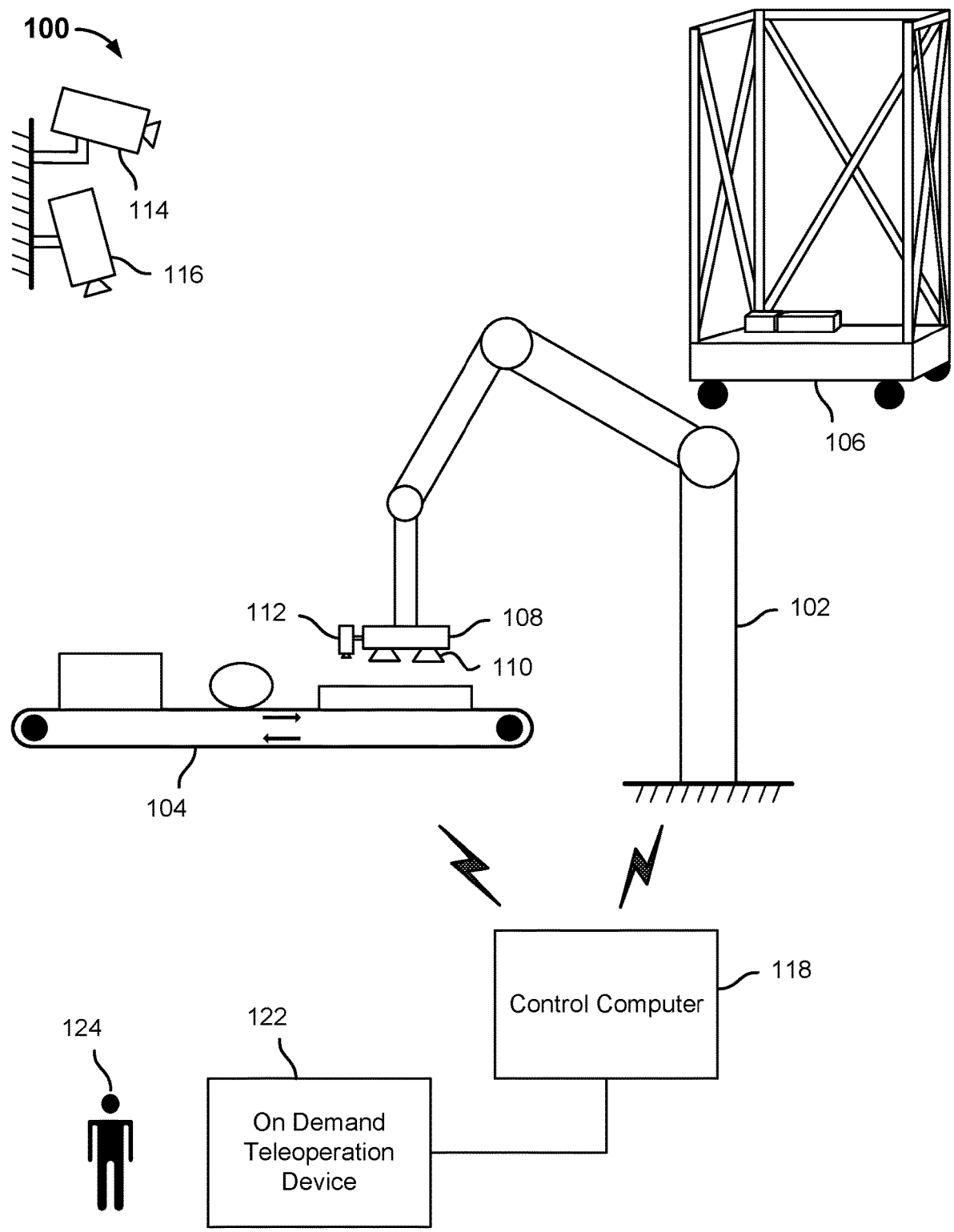
FIG. 1 is a diagram illustrating an embodiment of a robotic system to palletize and/or depalletize heterogeneous items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to programmatically use a robotic system comprising one or more robots (e.g., robotic arm with suction, gripper, and/or other end effector at operative end) to palletize/depalletize and/or to otherwise pack and/or unpack arbitrary sets of non-homogeneous items (e.g., dissimilar size, shape, weight, weight distribution, rigidity, fragility, etc.

In various embodiments, 3D cameras, force sensors, and other sensors are used to detect and determine attributes of items to be picked and/or placed. Items the type of which is determined (e.g., with sufficient confidence, as indicated by a programmatically determined confidence score, for example) may be grasped and placed using strategies derived from an item type-specific model. Items that cannot be identified are picked and placed using strategies not specific to a given item type. For example, a model that uses size, shape, and weight information may be used.

In various embodiments, a library of item types, respective attributes, and grasp strategies is used to determine and implement a strategy to pick and place each item. The library is dynamic in some embodiments. For example, the library may be augmented to add newly-encountered items and/or additional attributes learned about an item, such as grasp strategies that worked or did not work in a given context. In some embodiments, human intervention may be invoked if the robotic system gets stuck. The robotic system may be configured to watch (e.g., using sensors) and learn (e.g., updating a library and/or model) based on how a human teleoperator intervenes to use the robotic arm, for example, to pick and place an item via teleoperation. In some embodiments, teleoperation may include higher-level forms of feedback, such as a human indicating a particular point in a 2D RGB image at which the robot should grasp an object.

In some embodiments, a robotic system as disclosed herein may engage in a process to gather and store (e.g., add to library) attributes and/or strategies to identify and pick/place an item of unknown or newly-discovered type. For example, the system may hold the item at various angles and/or locations to enable 3D cameras and/or other sensors to generate sensor data to augment and/or create a library entry that characterizes the item type and stores a model of how to identify and pick/place items of that type.

In various embodiments, a high level plan to pick and place items on a pallet or other container or location is made. Strategies are applied, e.g., based on sensor information, to implement the plan by picking and placing individual items according to the plan. Deviations from the plan and/or re-planning may be triggered, e.g., the robotic system gets stuck, the stack of items on the pallet is detected (e.g., by computer vision, force sensors, etc.) to have become unstable), etc. A partial plan may be formed based on known information (e.g., next N items visible on a conveyor, next N items on an invoice or manifest, etc.) and adjustments made as additional information is received (e.g., next items visible, etc.). In some cases, the system is configured to stage (e.g., set aside, within reach) items determined less likely to be suitable to be stacked in a layer or container the system is currently building, such as a lower (or higher) layer in a pallet or container, etc. Once more information is known about next items to be picked/placed, a strategy that takes into account the staged (buffered) items and next items is generated and implemented.

FIG. 1 is a diagram illustrating an embodiment of a robotic system to palletize and/or depalletize heterogeneous items. In the example shown, system 100 includes a robotic arm 102. In this example the robotic arm 102 is stationary, but in various alternative embodiments robotic arm 102 may be a fully or partly mobile, e.g., mounted on a rail, fully mobile on a motorized chassis, etc. As shown, robotic arm 102 is used to pick arbitrary and/or dissimilar items from a conveyor belt (or other source) 104 and stack them on a pallet or other receptacle 106. In the example shown, receptacle 106 comprise a pallet or base with wheels at the four corners and at least partially closed on three of four sides, sometimes referred to as a three-sided "roll pallet", "roll cage", and/or "roll" or "cage" "trolley". In other embodiments, a roll or non-wheeled pallet with more, fewer, and/or no sides may be used. In some embodiments, other robots not shown in FIG. 1 may be used to push receptacle 106 into position to be loaded/unloaded and/or into a truck or other destination to be transported, etc.

In the example shown, robotic arm 102 is equipped with a suction-type end effector 108. End effector 108 has a plurality of suction cups 110. Robotic arm 102 is used to position the suction cups 110 of end effector 108 over an item to be picked up, as shown, and a vacuum source provides suction to grasp the item, lift it from conveyor 104, and place it at a destination location on receptacle 106.

In various embodiments, one or more of 3D or other camera 112 mounted on end effector 108 and cameras 114, 116 mounted in a space in which robotic system 100 is deployed are used to generate image data used to identify items on conveyor 104 and/or determine a plan to grasp, pick/place, and stack the items on receptacle 106. In various embodiments, additional sensors not shown, e.g., weight or force sensors embodied in and/or adjacent to conveyor 104 and/or robotic arm 102, force sensors in the x-y plane and/or z-direction (vertical direction) of suction cups 110, etc. may be used to identify, determine attributes of, grasp, pick up, move through a determined trajectory, and/or place in a destination location on or in receptacle 106 items on conveyor 104 and/or other sources and/or staging areas in which items may be located and/or relocated, e.g., by system 100.

In the example shown, camera 112 is mounted on the side of the body of end effector 108, but in some embodiments camera 112 and/or additional cameras may be mounted in other locations, such as on the underside of the body of end effector 108, e.g., pointed downward from a position between suction cups 110, or on segments or other structures of robotic arm 102, or other locations. In various embodiments, cameras such as 112, 114, and 116 may be used to read text, logos, photos, drawings, images, markings, barcodes, QR codes, or other encoded and/or graphical information or content visible on and/or comprising items on conveyor 104.

Referring further to FIG. 1, in the example shown system 100 includes a control computer 118 configured to communicate, in this example via wireless communication (but in one or both of wired and wireless communication in various embodiments) with elements such as robotic arm 102, conveyor 104, effector 108, and sensors, such as camera 112, 114, and 116 and/or weight, force, and/or other sensors not shown in FIG. 1. In various embodiments, control computer 118 is configured to use input from sensors, such as camera 112, 114, and 116 and/or weight, force, and/or other sensors not shown in FIG. 1, to view, identify, and determine one or more attributes of items to be loaded into and/or unloaded from receptacle 106. In various embodiments, control computer 118 uses item model data in a library stored on and/or accessible to control computer 118 to identify an item and/or its attributes, e.g., based on image and/or other sensor data. Control computer 118 uses a model corresponding to an item to determine and implement a plan to stack the item, along with other items, in/on a destination, such as receptacle 106. In various embodiments, the item attributes and/or model are used to determine a strategy to grasp, move, and place an item in a destination location, e.g., a determined location at which the item is determined to be placed as part of a planning/replanning process to stack items in/on the receptacle 106.

In the example shown, control computer 118 is connected to an "on demand" teleoperation device 122. In some embodiments, if control computer 118 cannot proceed in a fully automated mode, for example, a strategy to grasp, move, and place an item cannot be determined and/or fails in a manner such that control computer 118 does not have a strategy to complete picking and placing the item in a fully automated mode, then control computer 118 prompts a human user 124 to intervene, e.g., by using teleoperation device 122 to operate the robotic arm 102 and/or end effector 108 to grasp, move, and place the item.

Figure 2:
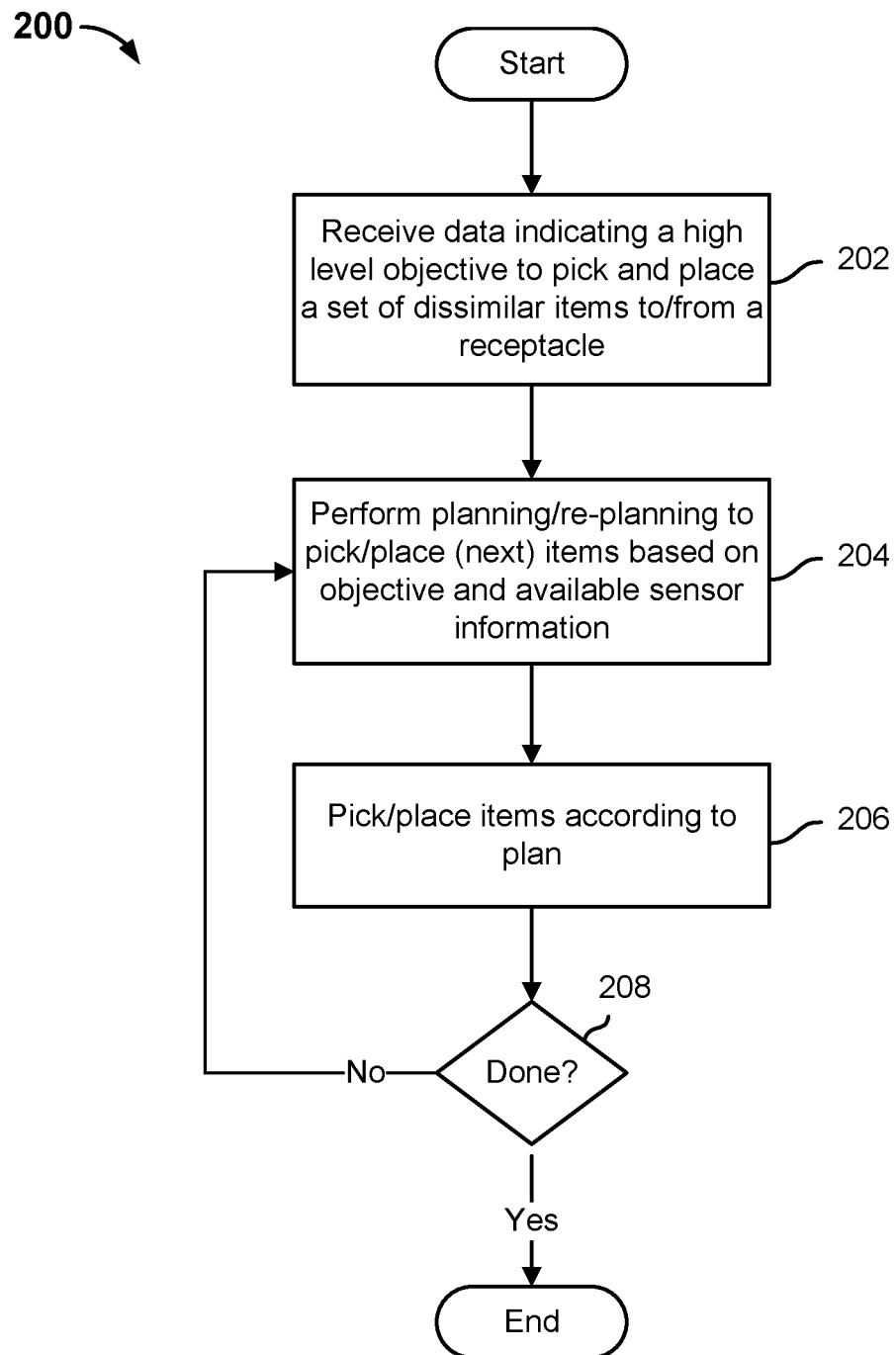
FIG. 2 is a flow chart illustrating an embodiment of a process to palletize and/or depalletize.

FIG. 2 is a flow chart illustrating an embodiment of a process to palletize and/or depalletize. In various embodiments, the process 200 of FIG. 2 is performed by a control computer comprising a robotic system to palletize and/or depalletize heterogeneous items, such as control computer 118 of FIG. 1. In the example shown, at 202 data indicating a high level objective to pick and place a set of dissimilar items (i.e., the set includes two or more different types of item) to/from a receptacle, such as a pallet, is received. For example, a control computer such as control computer 118 of FIG. 1 may receive an input to load items arriving on conveyor 104 onto receptacle 106. In some embodiments, an input indicating explicitly the items expected and/or desired to be loaded, such as an invoice or manifest, may be received.

At 204, planning (or re-planning) is performed to generate a plan to pick/place items based on the high level objective received at 202 and available sensor information. For example, in the example shown in FIG. 1, 3D or other image data generated by one or more of cameras 112, 114, and 116 may be used, along with sensor data from sensors not shown in FIG. 1 (e.g., weight sensors) to identify and determine a plan to pick, place, and stack on receptacle 106 items arriving via conveyor 104.

In some embodiments, the system may make a plan based at least in part on an invoice or other list. A plan to stack items may be generated based on item size, weight, density, weight distribution, rigidity, capacity of the item and/or its box or other packaging to support weight stacked on top of the item, etc. The control computer in some embodiments controls the order in which items arrive at the loading location, such as via conveyor 104. In some embodiments, items may arrive in an order not known a priori and/or the list of items may not be known. In some such embodiments, cameras (e.g., 112, 114, 116) and/or other sensors are used to identify items and/or their attributes, generate/update a plan to stack items on the pallet or other receptacle (e.g., receptacle 106), and/or to determine strategies to grasp, pick up, move, and place each item in its corresponding place according to the stacking plan determined at 204.

At 206, items are picked (e.g., grasped from conveyor 104, in the example shown in FIG. 1), moved through a (predetermined/planned) trajectory to a location near where the item is to be placed, and placed at the destination according to the plan determined and/or updated at 204.

In various embodiments, a packing plan may include planned use of stackable trays, crates, boxes, bins, or other containers to group smaller and/or irregularly-shaped items and pack as a more readily stacked unit. In some embodiments, in a depalletizing operation a robotic system as disclosed herein is configured to recognize such containers, open them if needed, and empty them by removing individual items. Once emptied, the container is moved to a staging location, from which in various embodiments other robots and/or human workers may retrieve and move them out of the way.

In the example shown, (re-)planning and plan implementation (204, 206) continue until the high level objective (202) is completed (208), at which the process 200 ends. In various embodiments, re-planning (204) may be triggered by conditions such as arrival of an items that is not expected and/or cannot be identified, a sensor reading indicating an attribute has a value other than what was expected based on item identification and/or associated item model information, etc. Other examples of unexpected conditions include, without limitation, determining that an expected item is missing, reevaluating item identification and determining an item is other than as originally identified, detecting an item weight or other attribute inconsistent with the item as identified, dropping or needing to re-grasp the item, determining that a later-arriving item is too heavy to be stacked on one or more other items as contemplated by the original and/or current plan, and detecting instability in the set of items as stacked on the receptacle.

Figure 3A:
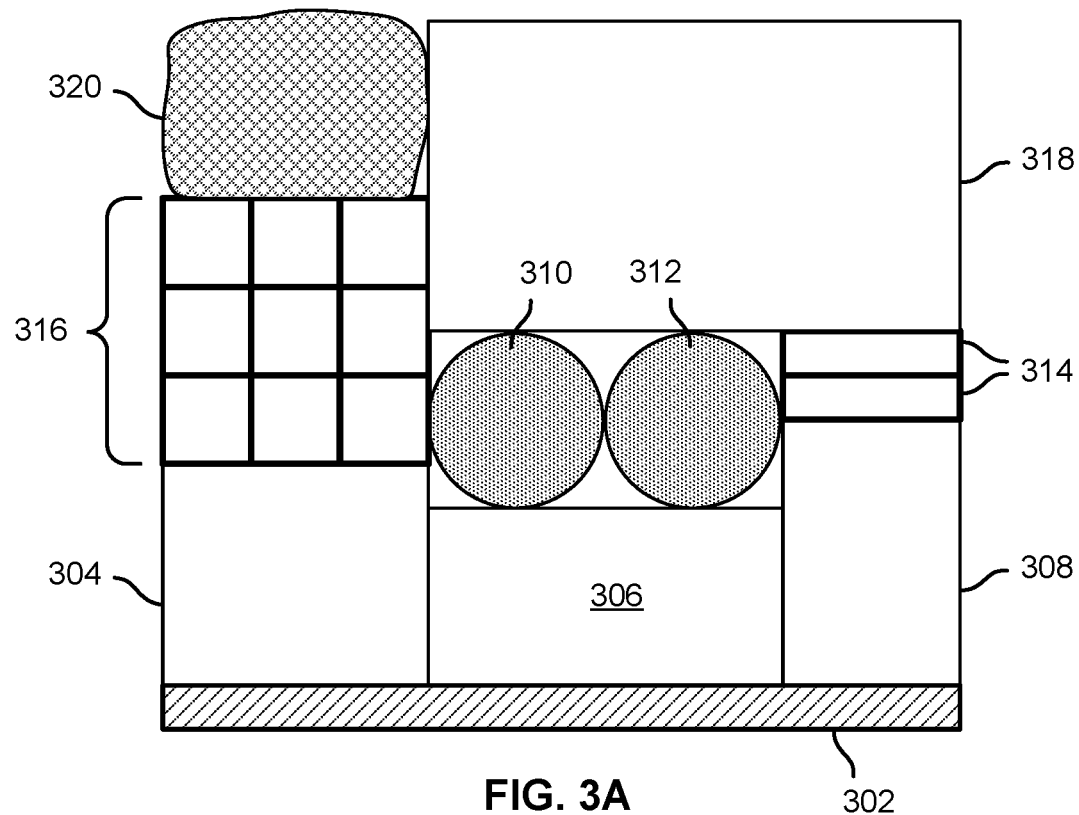
FIG. 3A is a diagram illustrating an example of a pallet as assembled in an embodiment of a robotic system to palletize and/or depalletize heterogeneous items.

FIG. 3A is a diagram illustrating an example of a pallet as assembled in an embodiment of a robotic system to palletize and/or depalletize heterogeneous items. In various embodiments, the items shown in FIG. 3A as stacked on pallet 302 may have been stacked by a robotic system, such as system 100 of FIG. 1, according to a computer-determined (and/or updated) plan, as in the process 200 of FIG. 2.

In the example shown, items 304, 306, and 308 are stacked in a first (bottom-most) layer, with items 310, 312, 314, and 316 stacked in a layer on top of items 304, 306, and 308. Items 318 and 320 have been stacked on top.

In various embodiments, the items as shown may have been selected and designated to be placed as shown in FIG. 3A based on item identification and/or attributes, e.g., as determined and/or measured based on image, weight, and/or other sensor data. For example, items 304, 306, and 308 may have been placed in the bottom layer, as shown, based on their (relative) size, weight, rigidity, strength, and/or other indication of ability (of item and/or packaging) to support weight stacked on top.

The placement, orientation, etc., of each item is determined in various embodiments by applying one or more heuristics, algorithms, or other tools and/or techniques. For example, each item is added at least in part by determining a location within the entire pallet and/or in a layer currently being stacked and/or arranged so as to provide a relatively (more) flat top surface to form the basis for a next layer, to minimize stack surface area, to minimize current layer perimeter, etc. In various embodiments, one or more of the following heuristics may be used: place next item to maintain center of mass close to the center of the pallet; maintain a clear motion path for the robotic arm for subsequent items; maintain visibility of the cameras to all top layer boxes or unboxed items; etc.

In the example shown, items 310 and 312 are round (at least in cross-section), and in some embodiments their shape would be taken into consideration in selecting a location to place them. For example, an interior location in which items 310 and 312 are constrained by other adjacent items, as shown in FIG. 3A, may be selected over a location on the edge or end of a layer.

Items 318 and 320 may have been selected to be placed on top, in various embodiments, based on one or more attributes, such as their weight (or density), ability to support weight stacked on top of them, etc.

Figure 3B:
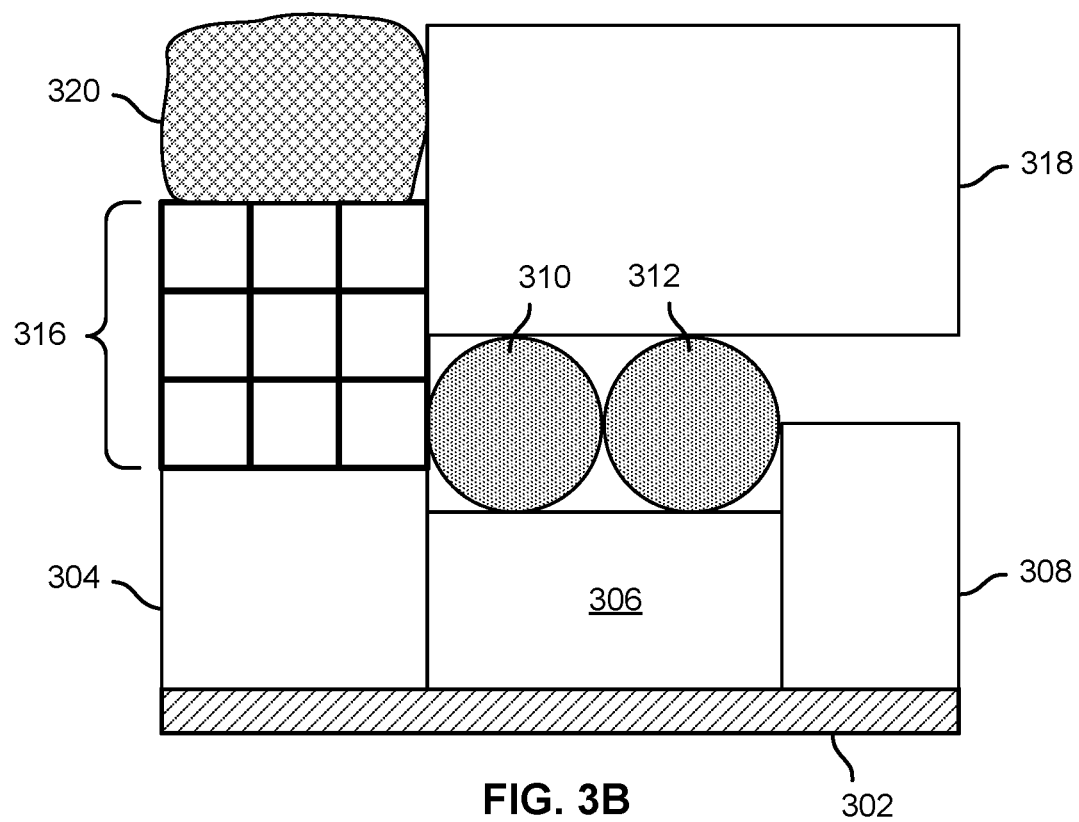
FIG. 3B is a diagram illustrating an example of a pallet as assembled in an embodiment of a robotic system to palletize and/or depalletize heterogeneous items.

FIG. 3B is a diagram illustrating an example of a pallet as assembled in an embodiment of a robotic system to palletize and/or depalletize heterogeneous items. In this example, the items 314 included in the example as shown in FIG. 3A are omitted. In various embodiments, a plan to stack items as shown in FIG. 3B may be generated by a control computer, such as control computer 118 of FIG. 1. In the example shown, an algorithmically generated plan may consider the item 318 stacked on items 310, 312 to be in a stable position. For example, there may be no computed net moment about any point or axis that would lead a control computer to determine the position as shown is not stable. In practice, however, slight deviation from plan in the placement of items on pallet 302 could result in the item 318 not being in a stable position once stacked on items 310, 312, for example. In some embodiments, a robotic arm and end effector (e.g., suction, gripper) used to place item 318 includes sensors and logic to detect instability. For example, image data may be processed and may indicate the items is leaning to the right, as shown. Or, prior to releasing the item 318 force sensors in the end effector may be used to detect the item would not be stable if released. For example, if the item gives way (or provides resistance unevenly) when pressed down but not yet released, in various embodiments the system determines the item is not stable.

In various embodiments, detection of unexpected instability triggers responsive action. For example, other items (e.g., items 314 as in FIG. 3A) may be placed in position to further support the item that was not stable. Or, the item may be shifted to a different nearby position (e.g., snugged left in the example shown), to see if the item would be stable in the new position. In various embodiments, if automated processing fails to determine a resolution, human intervention (e.g., via teleoperation, manually, etc.) may be triggered.

Figure 4A:
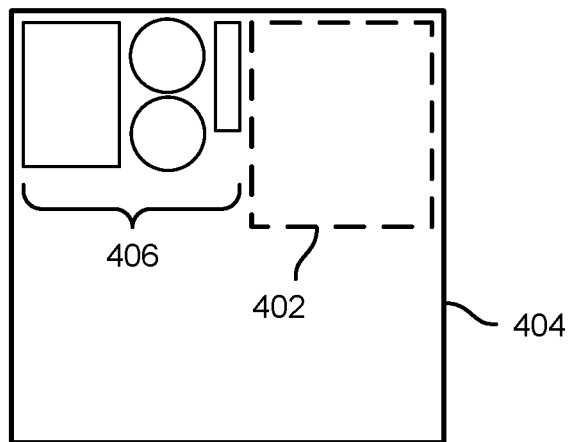
FIG. 4A is a diagram illustrating an example of item placement on a pallet in an embodiment of a robotic system to palletize and/or depalletize heterogeneous items.

FIG. 4A is a diagram illustrating an example of item placement on a pallet in an embodiment of a robotic system to palletize and/or depalletize heterogeneous items. In the example shown, a location 402 has been determined to place an item (not shown in FIG. 4A) on a pallet 404 in a position adjacent to previously-placed items 406. For example, the location 402 may have been determined based on item attributes (size, weight, dimensions, etc.), as in 204 of FIG. 2.

Figure 4B:
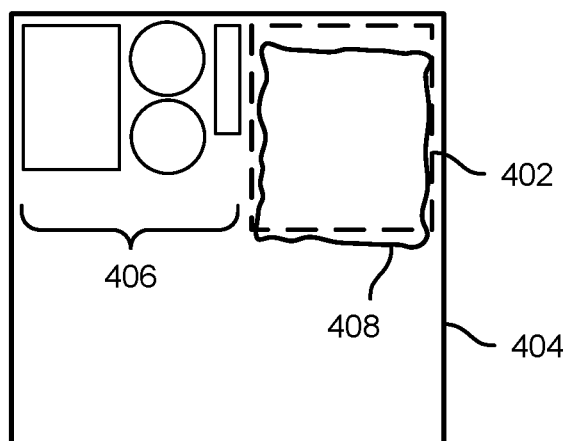
FIG. 4B is a diagram illustrating an example of item placement on a pallet in an embodiment of a robotic system to palletize and/or depalletize heterogeneous items.

FIG. 4B is a diagram illustrating an example of item placement on a pallet in an embodiment of a robotic system to palletize and/or depalletize heterogeneous items. In the example shown, the item 408 has been moved to a first order of accuracy to a position at or near the intended location 402. In this example, the item 408 has a slightly irregular outer texture, which may have resulted in imperfect picking and/or placement of the item at or near location 402. In some embodiments, variations and/or inconsistencies in the image data and/or other sensor data received concerning one or more of location 402, pallet 404, items 406, and item 408 may have resulted in the imperfect placement of item 408 as shown in FIG. 4B.

Figure 4C:
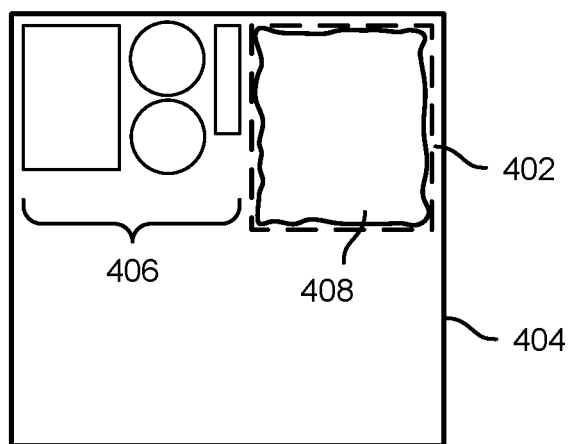
FIG. 4C is a diagram illustrating an example of item placement on a pallet in an embodiment of a robotic system to palletize and/or depalletize heterogeneous items.

FIG. 4C is a diagram illustrating an example of item placement on a pallet in an embodiment of a robotic system to palletize and/or depalletize heterogeneous items. In the example shown, the item 408 has been snugged into a location at or near planned location 402 to a second order of accuracy. In various embodiments, second order sensors, such as force sensors embodied in/on a robotic arm and/or end effector, are used to snug an item into a more tightly-fitted position in a stack. For example, the robotic arm may be used to snug an item, such as item 408, to a position more close and in (more complete) contact with adjacent items (e.g., items 406) and/or other structures, such as side walls (in the case of a pallet or trolley that has one or more side walls, for example).

In some embodiments, an item such as item 408 may be snugged more closely to adjacent items, sidewalls, etc. and may result in the item ending up in a location not entirely consistent with the original plan. In some embodiments, snug placement is desired and preferred within layers to maximize the use of available space and to maximize stability by couple adjacent items to one another and (as applicable) to adjacent structures, such as sidewalls.

Figure 5:
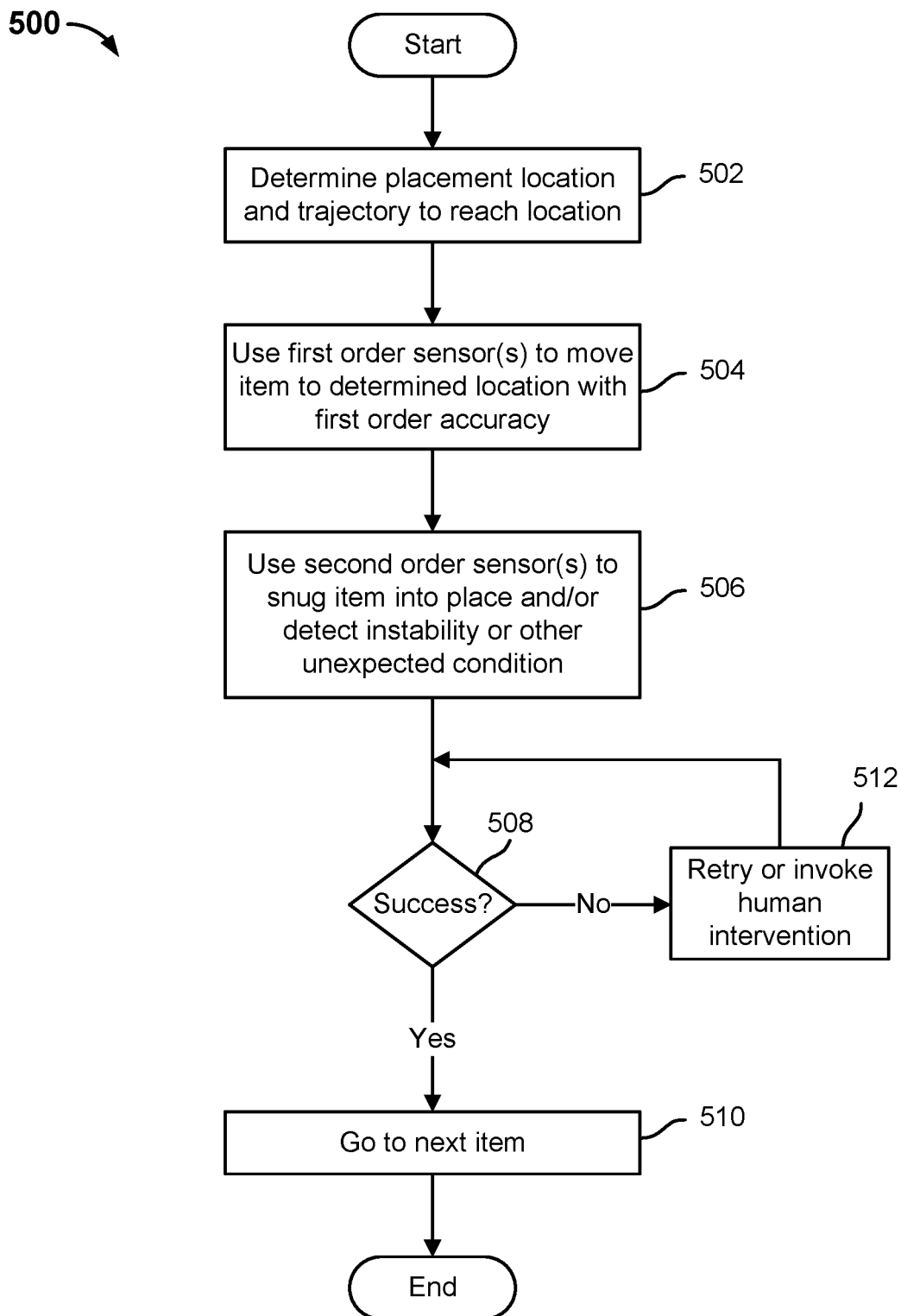
FIG. 5 is a flow chart illustrating an embodiment of a process to place an item on a pallet.

FIG. 5 is a flow chart illustrating an embodiment of a process to place an item on a pallet. In various embodiments, the process 500 is performed by a control computer, such as control computer 118 of FIG. 1, e.g., to pick and place successive items according to a plan.

In the example shown, at 502 a placement location and trajectory to reach the location are determined for a next item to be picked and placed. For example, a predetermined (e.g., according to a plan) and/or a dynamically-determined (e.g., based on item identification, sensor data, locations of previously-placed items, etc.) location and a trajectory to move the item to that location may be determined. At 504, one or more first order sensors (e.g., image data) are used to move the item to the destination location with first order accuracy (e.g., as in the example shown in FIG. 4B). At 506, one or more second order sensors (e.g., force sensors) are used to snug the item into place (as in FIG. 4C) and/or to detect instability (as in FIG. 3B) or other unexpected conditions. If the item is determined at 508 to have been placed successfully, at 510 processing continues with a next item, with respect to which a next iteration of the process 500 is performed. If the item is determined at 508 not to have been placed successfully (e.g., item not in expected location as determined by image data, item not stable, stack not stable, etc.), then at 512 the system tries again via automated processing to securely place the item, e.g., if a further strategy to attempt to do so is available, and/or human intervention is invoked (e.g., via on demand teleoperation) until the item is determined at 508 to have been placed successfully.

In various embodiments, a robotic system to palletize/depalletize as disclosed herein is configured to make and/or update dynamically a plan to place and stack items. For example, the next item(s) to be placed may not be known ahead of time, and adjustments to the plan may be required. For example, if soft and/or fragile items have been placed or planned to be placed in a lower layer and heavier items are detected to be arriving (next), the plan may be adjusted dynamically to buffer (set aside in a staging area) the soft and/or fragile items, allowing the heavier items to be placed in the lower level first. In some embodiments, if the soft and/or fragile items have already been placed (e.g. on the pallet), the items may be removed to the buffer (staging) area to allow the heavier items to be placed in the lower level in their place.

Figure 6:
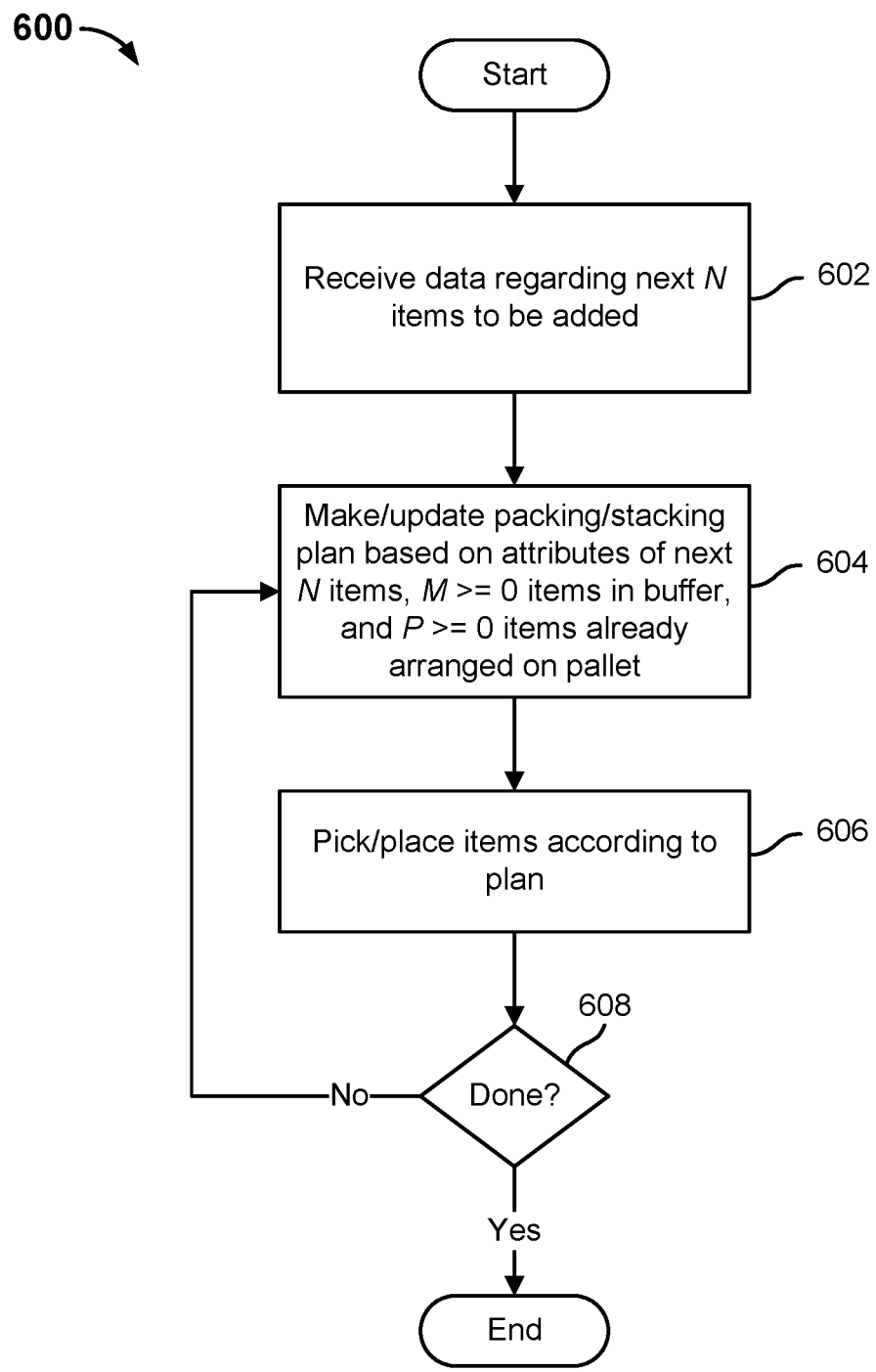
FIG. 6 is a flow chart illustrating an embodiment of a process to place items on a pallet.

FIG. 6 is a flow chart illustrating an embodiment of a process to place items on a pallet. In various embodiments, the process 600 is performed by a control computer, such as control computer 118 of FIG. 1, based on sensor data, such as image data generated by cameras 112, 114, and 116 and/or weight or other sensors. In the example shown, at 602 data regarding the next N items to be added to the pallet or other receptacle is received. For example, image, weight, shape, item identification, invoice, optical or other scanner output, and/or other data may be received.

At 604, a plan to pick, move, and pack/stack items is made and/or updated based on the data received at 602 and/or previously-determined data. For example, the plan may be made and/or updated at 604 based on attributes of the next N items, attributes of M (zero or more) items in a buffer (staging) area, and items P (zero or more) already placed and currently arranged on the pallet. For example, if the N items include items that are heavier than the M items in the buffer but lighter than the P items already on the pallet, the plan may be updated to place the N items next followed (tentatively) by the M items in the buffer. Conversely, if the N items were larger and heavier than both the M items in the buffer and the P items already on the pallet, the P items may be removed to the buffer and the N item placed in the bottom layer.

At 606, items are picked (e.g., from the conveyor or other source, the buffer or staging area, and/or the pallet, as required) to implement the plan. If implementation of the plan results in the high level objective being determined at 608 to have been completed (e.g., all items placed), the process ends. Otherwise, receipt of data, updating the plan, and picking/placing according to the plan (602, 604, 606) continue until done (608).

Figure 7:
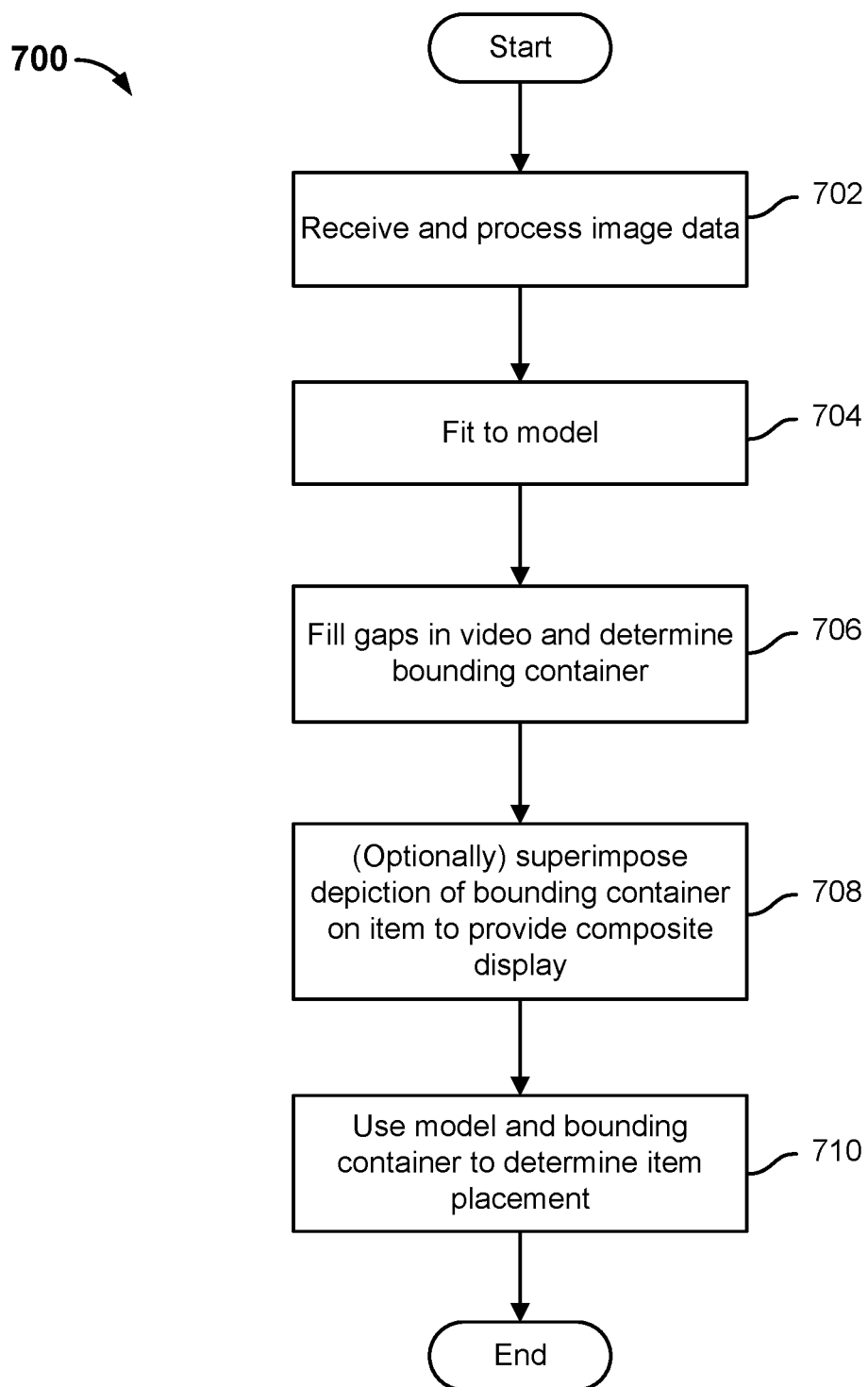
FIG. 7 is a flow chart illustrating an embodiment of a process to place an item on a pallet.

FIG. 7 is a flow chart illustrating an embodiment of a process to place an item on a pallet. In various embodiments, the process 700 is performed by a control computer, such as control computer 118 of FIG. 1, based on sensor data, such as image data generated by cameras 112, 114, and 116. In various embodiments, the process 700 is used to determine item attributes and placement dynamically, e.g., based on item size and shape as determined based at least in part on image data.

In the example shown, at 702 image data is received and processed. For example, image data from two or more cameras may be received and merged to generate a composite set of points in three dimensional space.

At 704, image data received and processed at 702 is fitted to a model. For example, the composite set of points may be compared to corresponding data comprising a library of item models and a "best fit" or "best match" model may be determined.

At 706, gaps in the image data are filled, e.g., using data from the best fit model, and a bounding container (e.g., a bounding "box" for an item that is rectangular or nearly so in all dimensions) is determined for the item.

Optionally, at 708, a graphical depiction of the bounding container is superimposed on the composite and/or raw image of the item (e.g., raw video) to provide a composite display, e.g., to a human user monitoring the operation.

At 710, the model determined at 704 and the bounding container determined at 706 are used to determine a destination location at which to place the item (e.g., on a pallet). In some embodiments, the bounding container may be displayed in the determined placement location, e.g., in a visual display and/or representation of the operation to pick and place the item.

Figure 8:
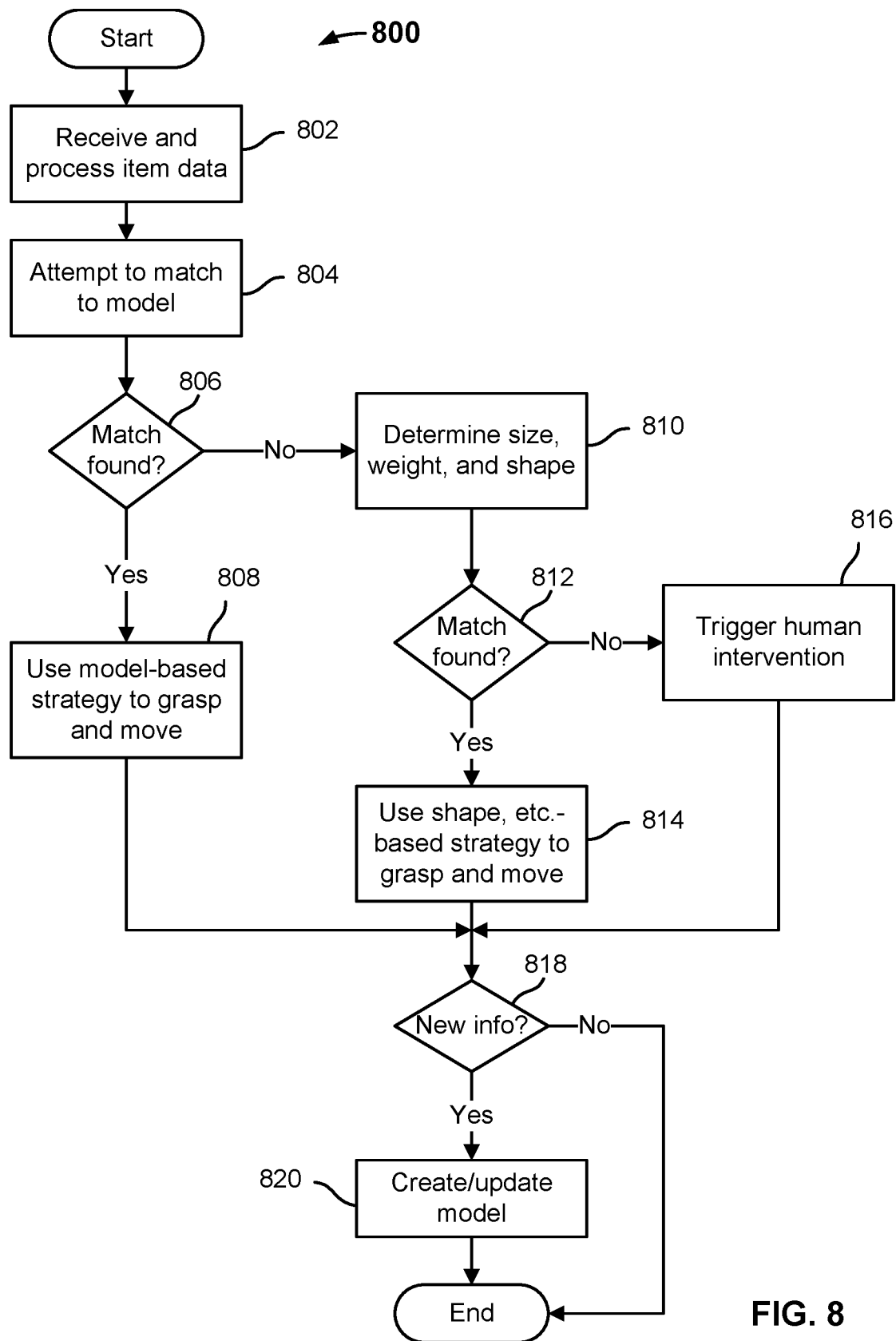
FIG. 8 is a flow chart illustrating an embodiment of a process to determine a strategy to place an item on a pallet.

FIG. 8 is a flow chart illustrating an embodiment of a process to determine a strategy to place an item on a pallet. In various embodiments, the process 800 is performed by a control computer, such as control computer 118 of FIG. 1. In the example shown, at 802 item data is received and processed. Example of item data include without limitation image data, optical or other scanner output, item weight, etc.

At 804, an attempt is made to match the item data to a model, e.g., a model comprising a library of item models. For example, markings on the item or its packaging may be read to identify the item and look up an item-specific model. In some embodiments, sensor readings may point in different directions. In some embodiments, outlier and/or randomly selected sensor data may be removed from consideration to determine whether the remaining data can be match (e.g., with a prescribed degree of confidence) to an item model. If so, the sensor data from that sensor is discarded and a match is determined at 806 to have been found.

If a match to an item-specific model is determined at 806 to have been found, based on the data received at 802, a strategy based on that model is used at 808 to determine a strategy to grasp, pick up, move, and/or place the item.

If it is determined at 806 that a match to an item-specific model cannot be found, at 810 the size, weight, shape, and/or other attributes of the item are determined and attempted to be matched to a model associated with items of that size, weight, shape, etc. If at 812 it is determine that a match to such a model has been found, at 814 the determined model is used to determine a strategy to grasp, pick up, move, and/or place the item. Otherwise, at 816 human intervention is triggered, e.g., to manually input a strategy and/or an item identification to be mapped to a strategy, and/or to complete all or part of the operation with respect to the item by teleoperation, manually, etc.

At 818 it is determined whether processing the item has generated additional or new information about the item and/or item type. If so, at 820 the new information is used to generate and/or update a model for the item and/or item type. If no new information has been developed and/or once such information has been reflected in any applicable model (s), the process ends.

In some embodiments, detection of a new item or item type triggers a discovery process in which attributes of the item may be determined and determined more fully or precisely. For example, the system may use the robotic arm to pick up the item and hold it in different locations and/or at different orientations to generate (additional) images or views of the item to be used to model or more completely model the item.

In various embodiments, a robotic system to palletize and/or depalletize heterogeneous items as disclosed herein includes a robotic arm with a suction-based, gripper-type, or other end effector at the operative end. The end effector in various embodiments may include on or more sensors used to palletize and/or depalletize heterogeneous items as disclosed herein. For example, the end effector may include image sensors used to facilitate first order picking and placing of an item and one or more force sensors to facilitate snugging items into place, e.g., adjacent to other items, sidewalls, and/or other structures. In another example, in some embodiments a suction-based end effectuator may include air pressure sensors to detect when a secure grasp has been made with the object surface and/or to detect when the object is losing contact or shearing off.

Figure 9:
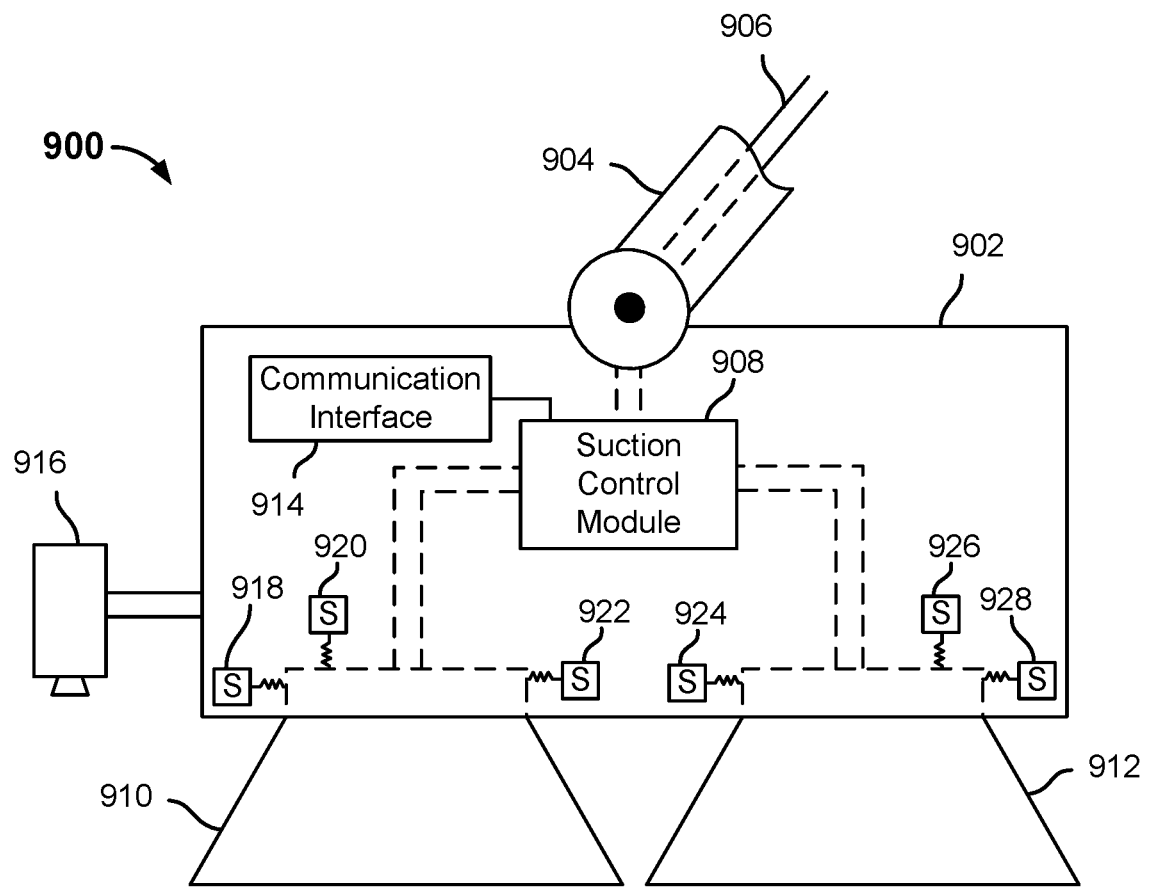
FIG. 9 is a block diagram illustrating an embodiment of a suction-based end effector in a robotic system to palletize and/or depalletize heterogeneous items.

FIG. 9 is a block diagram illustrating an embodiment of a suction-based end effector in a robotic system to palletize and/or depalletize heterogeneous items. In various embodiments, robotic arm end effector 900 of FIG. 9 may be used to implement end effector 108 of FIG. 1.

In the example shown, end effector 900 includes a body or housing 902 attached to robotic arm 904 via a rotatable coupling. In some embodiments, the connection between housing 902 and robotic arm 904 may comprise a motorized joint controlled by a control computer, such as control computer 118 of FIG. 1. End effector 900 further includes a suction or other pneumatic line 906 that runs through the robotic arm 904 into the housing 902 to supply a vacuum source to suction control module 908. In various embodiments, control module 908 is connected, e.g., via wireless and/or wired communication through communication interface 914 to a control computer external to end effector 900, e.g., control computer 118 of FIG. 1. The control module 908 includes electronic and/or electro-mechanical elements operable to supply suction force to suction cups 910, 912 comprising the end effector 900, e.g., to attach the end effector through suction to an item to be picked up, moved, and placed using end effector 900.

In the example shown, a camera 916 mounted on the side of housing 902 provides image data of a field of view below the end effector 900. A plurality of force sensors 918, 920, 922, 924, 926, and 928 measure force applied to the suction cups 910 and 912, respectively. In various embodiments, the force measurements are communicated via communication interface 914 to an external and/or remote control computer. The sensor readings are used in various embodiments to enable the robotic arm 904 and end effector 900 to be used to snug an item into place adjacent to other items and/or sidewalls or other structures, and/or to detect instability (e.g., insufficient push back with the item is pressed down upon while still under suction but in the place in which the item was expected to be placed and to be stable). In various embodiments, the horizontally mounted pairs of force sensors (e.g., 918 and 922, 924 and 928) are placed at right angles in the x-y plane, to enable force to be determined in all horizontal directions.

Figure 10:
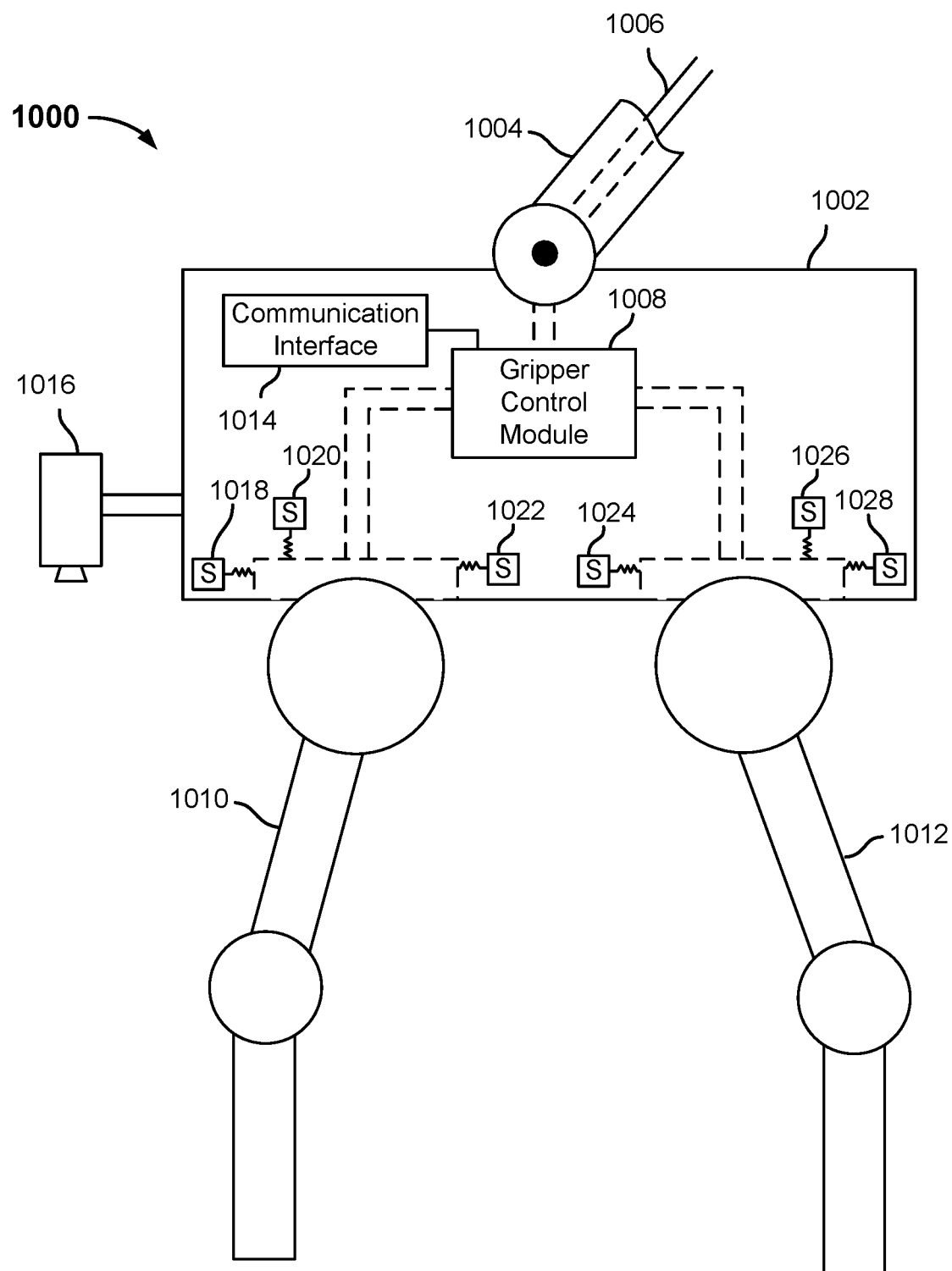
FIG. 10 is a block diagram illustrating an embodiment of a gripper-style end effector in a robotic system to palletize and/or depalletize heterogeneous items.

FIG. 10 is a block diagram illustrating an embodiment of a gripper-style end effector in a robotic system to palletize and/or depalletize heterogeneous items. In various embodiments, robotic arm end effector 1000 of FIG. 10 may be used to implement end effector 108 of FIG. 1.

In the example shown, end effector 1000 includes a body or housing 1002 attached to robotic arm 1004 via a rotatable coupling. In some embodiments, the connection between housing 1002 and robotic arm 1004 may comprise a motorized joint controlled by a control computer, such as control computer 118 of FIG. 1. End effector 1000 further includes a gripper comprising articulating digits 1010 and 1012 and a power line 1006 that runs through the robotic arm 1004 into the housing 1002 to supply electrical power to gripper control module 1008. In various embodiments, control module 1008 is connected, e.g., via wireless and/or wired communication through communication interface 1014 to a control computer external to end effector 1000, e.g., control computer 118 of FIG. 1. The control module 1008 includes electronic and/or electro-mechanical elements operable to manipulate the gripper digits 1010, 1012, e.g., to grasp an item to be picked up, moved, and placed using end effector 1000.

In the example shown, a camera 1016 mounted on the side of housing 1002 provides image data of a field of view below the end effector 1000. A plurality of force sensors 1018, 1020, 1022, 1024, 1026, and 1028 measure force applied to the mount points of digits 1010 and 1012, respectively. In various embodiments, the force measurements are communicated via communication interface 1014 to an external and/or remote control computer. The sensor readings are used in various embodiments to enable the robotic arm 1004 and end effector 1000 to be used to snug an item into place adjacent to other items and/or sidewalls or other structures, and/or to detect instability (e.g., insufficient push back with the item is pressed down upon while still under suction but in the place in which the item was expected to be placed and to be stable).

While a suction-type effector is shown in FIG. 9 and a gripper-type effector is shown in FIG. 10, in various embodiments one or more other and/or different types of end effector may be used in a robotic system to palletize/depalletize heterogeneous items, as disclosed herein.

In various embodiments, a plan to pick and stack items on a pallet or other receptacle and/or to depalletize items takes into consideration the trajectory through which each item is to be moved by the robotic arm. For example, a large box needs more clearance than a small item. Also, a later-placed item must be moved through a trajectory that avoids collisions with previously-placed items, etc.

In some embodiments, sensors are used to detect collisions with other items, the receptacle, and/or the environment, and to continue automated operation by "compliant" adjustment of the trajectory. For example, if a wall or other structure is bumped into, in some embodiments, the robotic arm reduces force and adjusts the trajectory to follow along the obstacle until it is clear of it.

Figures 11, 12:
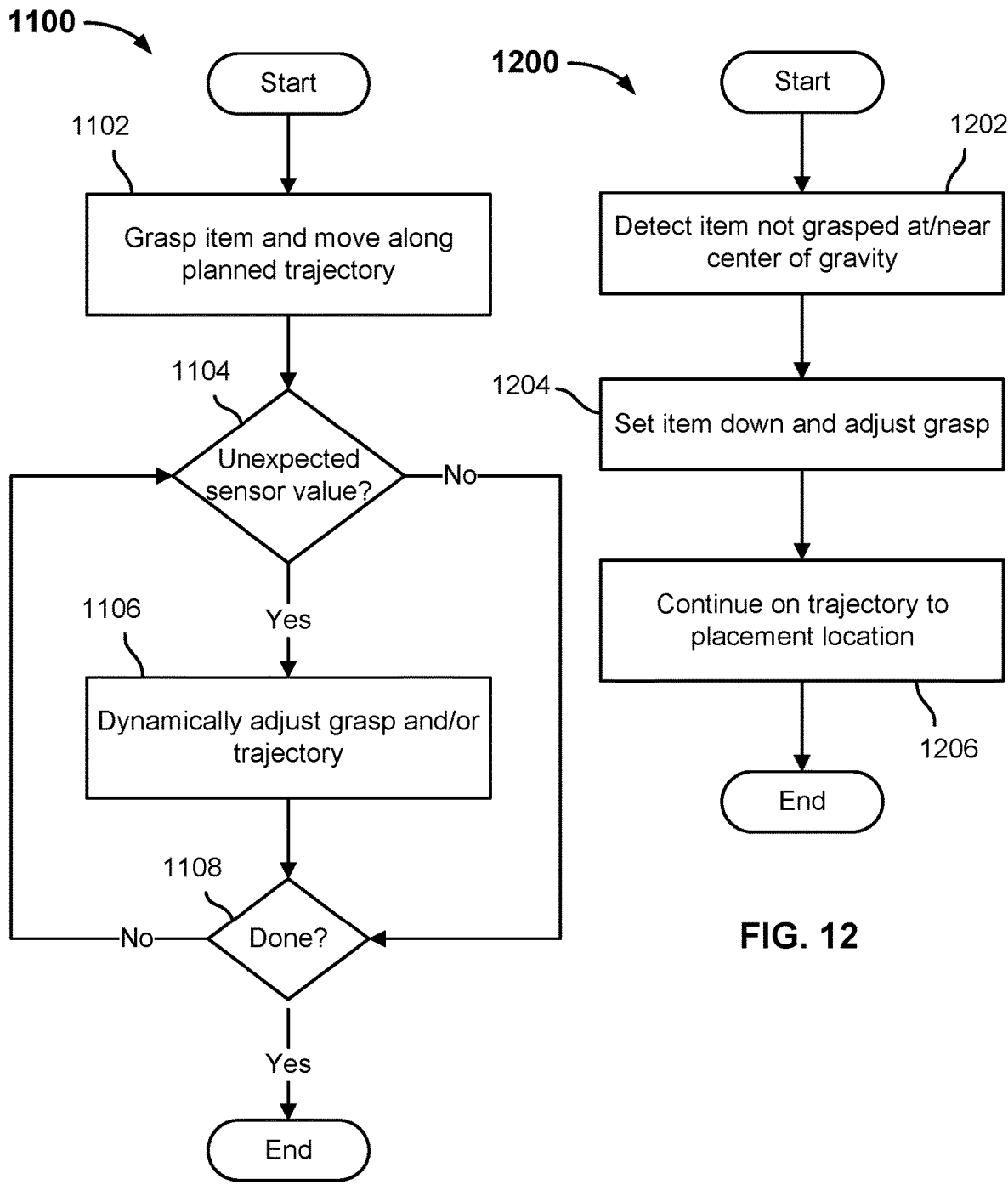
FIG. 11 is a flow chart illustrating an embodiment of a process to compliantly move an item to a destination location.
FIG. 12 is a flow chart illustrating an embodiment of a process to change a robotic arm grasp of an item.

FIG. 11 is a flow chart illustrating an embodiment of a process to compliantly move an item to a destination location. In various embodiments, the process 1100 of FIG. 11 may be implemented by a control computer, such as control computer 118 of FIG. 1, based at least in part on sensor readings from sensors comprising and/or otherwise associated with a robotic arm, end effector, and/or environment.

In the example shown, at 1102 an items is grasped and the items is begun to be moved along a planned trajectory. If an unexpected or threshold sensor value is received (1104), one or both of the grasp and/or the trajectory may be adjusted (1106). For example, if the item is detected to be slipping out of the original grasp, the robotic arm may be used to set the item down and re-grasp it more securely. If the item is determined (e.g., based on force sensors, image data, both, etc.) to have bumped up against an obstacle, the trajectory may be adjusted to move the item along and/or around the obstacle. For example, the originally planned trajectory may be deviated from so as to maintain a force sensor reading below a threshold. Once no opposing force is detected, the original trajectory may be resume, if possible, and/or a new next segment trajectory may be computed and followed.

If no (further) unexpected sensor value is encountered (1104), the items continues along its trajectory to its destination (1108).

FIG. 12 is a flow chart illustrating an embodiment of a process to change a robotic arm grasp of an item. In various embodiments, the process 1200 of FIG. 12 may be implemented by a control computer, such as control computer 118 of FIG. 1, based at least in part on sensor readings from sensors comprising and/or otherwise associated with a robotic arm, end effector, and/or environment. At 1202, the system (e.g., control computer, based on force/torque sensors and/or other data) detects the item has not been grasped at or near its center of gravity. For example, force and/or torque sensors may detect a greater than threshold torque about a connection point at which the end effector is attached to the robotic arm. Or, image data may indicate the item is not in a mostly level position while in the grasp of the robotic arm and end effector. At 1204, the item is set down (e.g., in a buffer or staging area, or in the location from which it was picked up, etc.) and the grasp is adjusted (e.g., the item is released and re-grasped at a different location). At 1206, the system resumes moving the item along a trajectory to the destination placement location.

Figure 13:
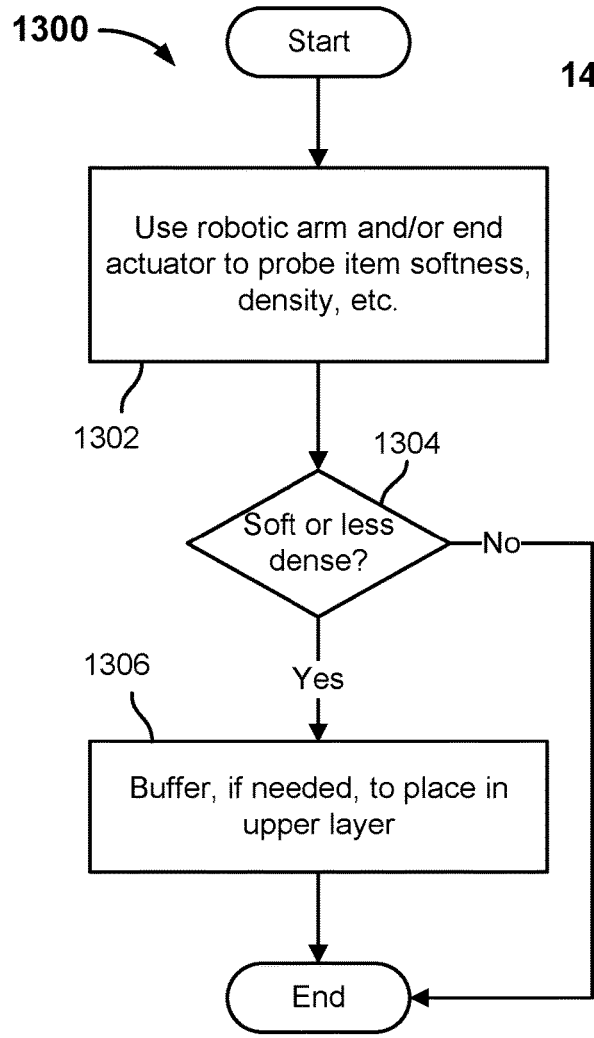
FIG. 13 is a flow chart illustrating an embodiment of a process to use a robotic arm to determine an attribute of an item to be stacked on a pallet.

FIG. 13 is a flow chart illustrating an embodiment of a process to use a robotic arm to determine an attribute of an item to be stacked on a pallet. In various embodiments, the process 1300 of FIG. 13 may be implemented by a control computer, such as control computer 118 of FIG. 1. In the example shown, a robotic arm and/or end effector is used to probe an item to determine one or more attributes of the item, for example how soft, heavy, dense, etc., the item is. For example, if the item gives to light pressure it is determined to be soft. If the item is light for its size, as determined based on image data, the item is determined to be less dense. If at 1304 the item has been determined to be soft and/or less dense, the item is buffered at 1306, if needed, to be placed in an upper layer of the stack. If the item is not determined at 1304 to be soft or less dense, the item is added to the stack without buffering at 1306.

Figure 14:
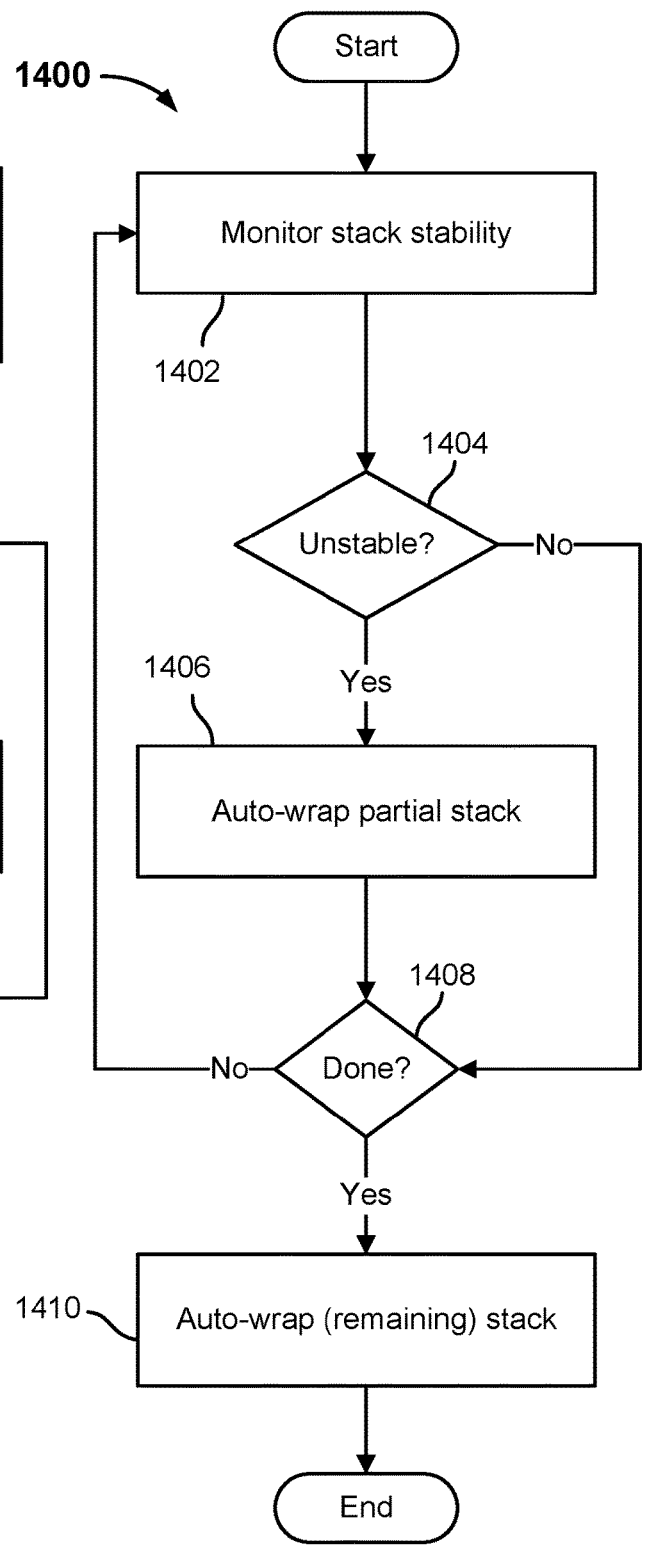
FIG. 14 is a flow chart illustrating an embodiment of a process to use a robotic arm to detect and respond to instability in a set of items as stacked on a pallet.

FIG. 14 is a flow chart illustrating an embodiment of a process to use a robotic arm to detect and respond to instability in a set of items as stacked on a pallet. In various embodiments, the process 1400 of FIG. 14 may be implemented by a control computer, such as control computer 118 of FIG. 1. In various embodiments, the process 1400 is used to detect stack instability, e.g., based on internal (e.g., force) and/or external (e.g., image) sensor data.

In the example shown, stack stability is monitored at 1402. For example, cameras in the environment may be used to detect that the stack has started to lean, crumble, slide, etc. Or, force sensors on the robotic arm and/or end effector may be used to detect that the stack or a portion thereof has become unstable. If at 1404 it is determined the stack has become unstable, at 1406 the partial stack is automatically wrapped, e.g. in plastic, to prevent slippage and reinforce the stability and structure of the stack. If the stack is not determined (again) at 1404 to have become unstable, and in any event once the entire stack (e.g., pallet or other receptacle) has been completed (1408), the stack and/or remaining unwrapped portion thereof is wrapped automatically at 1410 and the process ends.

In various embodiments, techniques disclosed herein enable arbitrary groups of heterogeneous items to be palletized and/or depalletize by a robotic system, without or with minimal human intervention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A robotic system, comprising:
    a communication interface; and
    a processor coupled to the communication interface and configured to:
        receive via the communication interface data associated with a plurality of items to be stacked on or in a destination location, wherein the data associated with the plurality of items enables a first attribute associated with an item of the plurality of items to be identified;
        determine a corresponding model for each of the plurality of items, wherein the processor is configured to determine that an item-specific model does not exist for the item and in response to a determination that the item-specific model does not exist for the item, determine whether an attribute-based model exists for the item, wherein the attribute-based model for the item is determined based in part on the first attribute associated with the item;
        in response to a determination that the attribute-based model exists for the item, generate based at least in part on the received data a plan to stack the items on or in the destination location based on the corresponding determined models for each of the plurality of items, wherein the plan includes a corresponding grasp strategy to pick and place each of the items based on the data associated with the plurality of items, wherein the corresponding grasp strategy to pick and place the item is based on the attribute-based model; and
        implement the plan at least in part by controlling a robotic arm to pick up the items and stack them on or in the destination location according to the plan.

2. The robotic system of claim 1, wherein the destination location comprises a pallet, box, or other receptacle.

3. The robotic system of claim 1, wherein the data associated with the plurality of items includes sensor data for at least a subset of the items.

4. The robotic system of claim 3, wherein the sensor data includes one or more of image data, weight data, force data, size data, dimension data.

5. The robotic system of claim 1, wherein the data associated with the plurality of items includes one or both of item and item type data for at least a subset of the items.

6. The robotic system of claim 5, wherein the one or both of item and item type data includes optical or other scanner output.

7. The robotic system of claim 1, wherein the processor is configured to generate the plan at least in part by determining for each of at least a subset of items a corresponding model for the item and to use the model to determine the plan with respect to the item.

8. The robotic system of claim 7, wherein the processor is further configured to detect a new item type or item attribute and to generate and store data updating a library of item models to reflect the new item type or the item attribute.

9. The robotic system of claim 1, wherein the processor is further configured to use the robotic arm to determine an attribute of at least a subset of the items.

10. The robotic system of claim 1, wherein the processor is further configured to monitor a stability associated with the at least one of the plurality of stacked items using one or more first order sensors or one or more second order sensors.

11. The robotic system of claim 1, wherein the processor is further configured to:
    monitor a stability associated with the at least one of the plurality of stacked items; and cause a wrap of a portion of the plurality of stacked items in response to determining that the at least one of the plurality of stacked items is unstable.

12. The robotic system of claim 1, wherein the processor is further configured to:
monitor a stability associated with the plurality of stacked items; and
cause a wrap of an unwrapped portion of the plurality of stacked items.

13. The robotic system of claim 1, wherein the processor is further configured to detect that the item being moved to the destination location on or in a receptacle has encountered an obstacle and to adjust a trajectory of the item to go along or around the obstacle.

14. The robotic system of claim 1, wherein in response to a determination that the attribute-based model does not exist for the item, the processor is configured to trigger human intervention to manually input the corresponding grasp strategy.

15. The robotic system of claim 1, wherein in response to a determination that the attribute-based model does not exist for the item, the processor is configured to trigger human intervention to input an item identification.

16. The robotic system of claim 1, wherein in response to a determination that the attribute-based model does not exist for the item, the processor is configured to trigger human intervention to complete some or all of the plan.

17. The robotic system of claim 1, wherein the processor is further configured to determine whether processing the item has generated additional or new information about the item and/or item type.

18. The robotic system of claim 17, wherein the processor is further configured to update the corresponding model for the item and/or item type in response to a determination that processing the item has generated additional or new information about the item and/or item type.

19. A method to control a robot, comprising:
receiving via a communication interface data associated with a plurality of items to be stacked on or in a destination location, wherein the data associated with the plurality of items enables a first attribute associated with an item of the plurality of items to be identified;
determining by a processor a corresponding model for each of the plurality of items, wherein determining the corresponding model for each of the plurality of items includes determining that an item-specific model does not exist for the item and in response to determining that the item-specific model does not exist for the item, determining that whether an attribute-based model exists for the item, wherein the attribute-based model for the item is determined based in part on the first attribute associated with the item;
in response to a determination that the attribute-based model exists for the item, using the processor to generate based at least in part on the received data a plan to stack the items on or in the destination location based on the corresponding determined models for each of the plurality of items, wherein the plan includes a corresponding grasp strategy to pick and place each of the items based on the data associated with the plurality of items, wherein the corresponding grasp strategy to pick and place the item is based on the attribute-based model; and
using the processor to implement the plan at least in part by controlling a robotic arm of the robot to pick up the items and stack them on or in the destination location according to the plan.

20. A computer program product to control a robot, the computer program product being embodied in a non-transitory computer readable medium and comprising computer instructions for:
receiving data associated with a plurality of items to be stacked on or in a destination location, wherein the data associated with the plurality of items enables a first attribute associated with an item of the plurality of items to be identified;
determining a corresponding model for each of the plurality of items, wherein determining the corresponding model for each of the plurality of items includes determining that an item-specific model does not exist for the item and in response to determining that the item-specific model does not exist for the item, determining whether an attribute-based model exists for the item, wherein the attribute-based model for the item is determined based in part on the first attribute associated with the item;
in response to a determination that the attribute-based model exists for the item, generating based at least in part on the received data a plan to stack the items on or in the destination location based on the corresponding determined models for each of the plurality of items, wherein the plan includes a corresponding grasp strategy to pick and place each of the items based on the data associated with the plurality of items, wherein the corresponding grasp strategy to pick and place the item is based on the attribute-based model; and
implementing the plan at least in part by controlling a robotic arm of the robot to pick up the items and stack them on or in the destination location according to the plan.

* * * * *